Patented Dec. 28, 1948

2,457,735

UNITED STATES PATENT OFFICE 2,457,735

BREAKING WATER-IN-OIL EMULSIONS

Michael Savoy, Chicago, Ill., assignor to The Pure Oil Company, Chicago, Ill., a corporation of Ohio No Drawing. Application April 5, 1946, Serial No. 659,883

3 Claims. (Cl. 252—332)

This invention relates to demulsifying of water-in-oil emulsions, and to a reagent suitable for breaking such emulsions.

An object of the invention is to provide an improved composition for breaking water-in-oil emulsions.

Another object of the invention is to provide an improved process for breaking water-in-oil emulsions.

Other objects of the invention will appear from the following description.

I have discovered that water-in-oil emulsions which are difficult to resolve can be broken by treatment with small amounts of alkali metal salts and ammonium salts of sulfonated mono- and dicyclic terpenes, such as pinene and limonene.

Compositions in accordance with my invention may be prepared as follows: 60 grams of pinene boiling between 312.8° and 316.4° F. is mixed with 40 cc. of carbon tetrachloride, and the mixture placed in a flask with a mechanical stirrer and a dropping funnel. The flask is cooled with ice water, and 51.3 grams of chlorosulfonic acid added slowly to the mixture through the funnel while the temperature is kept at about 41° F. After all the acid is added the stirring is continued for one hour, and the temperature then raised to 95° F., and stirring continued at this temperature for one hour. The reaction mixture gives a cloudy solution with water, indicating that the product is not completely soluble in water. The reaction mixture is treated with excess concentrated ammonium hydroxide, and enough ethyl alcohol is added to give an 80% solution with respect to the alcohol. The solution is filtered and evaporated to give the ammonium salt of the sulfonated pinene.

The sodium salt of sulfonated pinene was prepared in the same manner as the ammonium salt except that neutralization was effected with sodium bicarbonate instead of concentrated ammonium hydroxide.

The ammonium and sodium salts of sulfonated limonene are prepared in the same manner as described in connection with the preparation of salts of sulfonated pinene, except that sulfonation is preferably carried out at a temperature of approximately 59° to 77° F. It is important that the temperature be kept between approximately 32° and 100° F. during the sulfonation stage in order to prevent formation of polymers and other undesirable products. Any solvent which is not attacked by the acid may be used in place of carbon tetrachloride, such as paraffinic naphtha, or the solvent may be omitted. Likewise, the alcohol may be omitted in the neutralization step. Sulfonation may be effected by means of fuming or concentrated sulfuric acid instead of chlorosulfonic acid, but may require longer time to effect sulfonation.

In order to test the efficacy of the demulsifying agents prepared in accordance with my invention, a sample of crude oil emulsion from bromide sand of the Cumberland, Oklahoma field was tested by mixing therewith one gram of demulsifying agent per 1000 cc. of emulsion at a temperature of 140° F. and permitting the mixture to stand for a given period of time, after which it was centrifuged. The reagents tested were as follows:

Ammonium and sodium salts of sulfonated pinene, ammonium salt of sulfonated limonene (all prepared as hereinbefore described), ammonium salt of sulfonated spruce turpentine; ammonium salt of sulfonated eucalyptus oil. The ammonium salt of sulfonated spruce turpentine was prepared in accordance with the directions given in U. S. Patent No. 1,863,143. The ammonium salt of sulfonated eucalyptus oil was prepared as follows: 70 grams of eucalyptus oil was placed in a three necked flask provided with a mechanical stirrer, reflux condenser and a dropping funnel. 100 grams of concentrated sulfuric acid was added slowly while the temperature was not allowed to exceed 77° F. The stirring was continued for 4 hours at this temperature. The reaction mixture was almost insoluble in water and in sodium hydroxide. For this reason 25 grams of fuming sulfuric acid was added slowly keeping the temperature below 25° C. The temperature was raised to 28° C. and the stirring continued for 2 hours. Most of the reaction mixture was insoluble in water. The temperature was raised slowly to 68° C. and the stirring continued for 3 hours. A little ice was added to the reaction mixture. The upper layer was washed with a saturated solution of sodium sulfate and neutralized with ammonium hydroxide. Afterwards, the water was evaporated off. A very dark viscous material was obtained. The results of the tests on the several reagents are set forth in the following table:

Table

| Demulsifier 1 g. per 1000 cc. Emulsion | Per Cent Brine Separated at 140° F. | | | | Per Cent B. S. & W. After Centrifuging |
|---|---|---|---|---|---|
|  | 0.5 hr. | 1 hr. | 2 hrs. | 3 hrs. |  |
| Ammonium Salt of Sulfonated Pinene | 37.5 | 56.2 | 68.7 |  |  |
| Ammonium Salt of Sulfonated Limonene | 90.4 |  |  |  |  |
| Ammonium Salt of Sulfonated Spruce Turpentine | 0.0 | 0.0 | 0.0 | 13.3 | 2.0 |
| Ammonium Salt of Sulfonated Eucalyptus Oil | 0.0 | 0.0 | 0.0 | 0.0 | 15.0 |
| Sodium Salt of Sulfonated Pinene | 100 |  |  |  |  |

From the table it is evident that sodium salt of sulfonated pinene and the ammonium salt of sulfonated limonene were far superior to any of the other reagents tested, and that ammonium salt of sulfonated pinene was satisfactory as a demulsifying agent. The ammonium salt of sulfonated spruce turpentine and eucalyptus oil were virtually useless as demulsifying agents. It is further evident that both the ammonium salts of sulfonated spruce turpentine and eucalyptus oil resulted in the formation of bottom settlings, whereas there were no bottom settlings using ammonium salt of sulfonated pinene or limonene.

As previously pointed out the invention is directed to ammonium and alkali metal salts of sulfonated mono- and dicyclic terpenes and to the treatment of mineral oil emulsions containing water in the dispersed phase. In treating such emulsions treatment may be carried out at ordinary atmospheric temperature, provided the emulsion is sufficiently fluid at such temperatures. However, it is preferable to heat the emulsion to a temperature of approximately 120° to 175° F. in order to increase the liquidity of the emulsion and shorten the time for breaking the emulsion. The demulsifying operation may be carried on as a batch, semi-continuous or continuous process in the conventional manner. In commercial practice the demulsifying agent may be used in amounts of approximately 10 to 50 gallons of agent per 1000 barrels of emulsion, the amount depending somewhat on the temperature of treatment and the nature of the emulsion.

It is claimed:
1. The method of breaking water-in-oil emulsions comprising, mixing therewith a small amount of a demulsifying agent from the group consisting of ammonium salts and alkali metal salts of sulfonated substantially pure pinene and limonene.

2. The method of breaking water-in-oil emulsions comprising, mixing therewith a small amount, sufficient to break the emulsions, of a demulsifying agent from the group consisting of ammonium salts and alkali metal salts of sulfonated substantially pure pinene.

3. The method of breaking water-in-oil emulsions comprising, mixing therewith a small amount, sufficient to break the emulsions, of a demulsifying agent from the group consisting of ammonium salts and alkali metal salts of sulfonated substantially pure limonene.

MICHAEL SAVOY.

REFERENCES CITED

The following references are of record in the file of this patent:

UNITED STATES PATENTS

| Number | Name | Date |
| --- | --- | --- |
| 1,863,143 | Walker | June 14, 1932 |
| 2,061,617 | Downing et al. | Nov. 24, 1936 |
| 2,178,830 | Bruson | Nov. 7, 1939 |
| 2,186,132 | Zink | Jan. 9, 1940 |
| 2,220,678 | Cromwell et al. | Nov. 5, 1940 |